Patented Sept. 30, 1952

2,612,515

UNITED STATES PATENT OFFICE 2,612,515

USE OF PHOSPHITES IN ESTERIFICATION REACTIONS OF SYNTHETIC ALCOHOLS

Boyd E. Hudson, Jr., Cranford, Howard L. Wilson, Elizabeth, and Joseph F. Nelson, Rahway, N. J., assignors to Standard Oil Development Company, a corporation of Delaware No Drawing. Application October 22, 1949, Serial No. 123,081

5 Claims. (Cl. 260—475)

This invention relates broadly to a method for preventing color formation in chemical products during reactions and particularly to prevention of color in esterification reactions wherein there are impurities in the reactants of the type which tend to give undesirable color in the final products.

It has been discovered that very good quality organic esters, useful as plasticizers, can be prepared from impure synthetic alcohol products which normally yield colored ester products by the addition of certain organic phosphorous esters in very small quantities to the esterification reaction. It has been found that phosphites, both the simple esters and the polyphosphites such as those disclosed in copending application Serial No. 193,751, filed November 2, 1950, are particularly effective. They are especially desirable for use when carrying out esterifications in iron reactors, including mild acid stainless steels.

In modern large scale chemical industry, there are numerous occasions during which the intermediates which are used to produce chemical products are quite impure. Such impurities are frequently difficult, if not impossible, to remove from the starting materials, either because of their relatively low concentration or because their inherent chemical structure makes them extremely difficult to remove by conventional means. These impurities either contaminate the product directly or tend to cause side reactions and by-products during the reaction period, thus forming further impurities difficult to separate from the final product. Impurities in the final product may give highly undesirable color and may otherwise be unwanted contaminants and at the same time may present extremely difficult problems of removal. An especially acute purification problem is created by impurities present in chemical intermediates used to prepare pure chemical products such as colorless plastics and resins, very pure dyes, and pure pharmaceuticals and foodstuffs.

One such problem in purification is found in the manufacture of high purity water clear plasticizers which are especially useful for clear or light colored resins and plastics.

The ever expanding use of plastic materials, especially of the light colored types, including vinyl chloride polymers or copolymers, polyvinyl acetate, cellulose esters, acrylate and methacrylate resins, rubbers such as the emulsion copolymers of butadiene with styrene or acrylonitrile, or the copolymers of isobutylene with small amounts of a diolefin such as isoprene have created a large demand for suitable plasticizers. Alkyl esters and particularly di-2-ethylhexyl phthalate and di-n-octyl phthalate have been known to be satisfactory plasticizers for the aforementioned high molecular weight materials, but the supply of these plasticizers has been unable to keep pace with the expansion of the plastics industry, largely because of a shortage of alcohols suitable for the manufacture of the desired esters.

Other types of useful plasticizers are certain new alkyl esters of polybasic acids, in which the alkyl groups predominantly contain 8 carbon atoms in a branched chain structure. These can be prepared from certain novel monohydric aliphatic alcohol mixtures, and it has been discovered further that certain synthetic alcohols give esters of unexpectedly superior to comparable esters of this is especially true of $C_8$ isooctyl alcohols.

The alcohol mixtures preferred for use in these new alkyl ester plasticizers are best obtained by the "Oxo" process. The term "Oxo" process is well understood in the art as referring to a process wherein an olefin feed is first reacted or "oxonated" with carbon monoxide and hydrogen at a temperature between 250 and 400° F., and under a pressure of about 150 to 400 atmospheres in the presence of a cobalt or similar catalyst, generally introduced in the form of a fatty acid salt, to form aldehydes in accordance with the following reaction

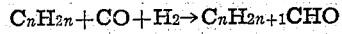

The aldehydes so formed are then catalytically hydrogenated to form the desired alcohols as follows:

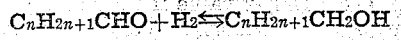

The preferred hydrogenation catalysts are those of the sulfur sensitive nickel type though other known hydrogenation catalysts such as the sulfides of nickel, molybdenum and cobalt, with or without support on carbon, silica, etc., can also be used, especially where a rugged sulfur-insensitive catalyst is desired. The basic principles and operating conditions of the "Oxo" process which can be used for making the desired alcohols are described, for example, in U. S. Patent 2,327,066 and elsewhere.

The over-all carbonylation or so-called "Oxo" reaction as outlined above, provides a particularly effective method for preparing valuable primary alcohols, particularly of the $C_4$ to $C_{12}$ range, which find large markets as intermediates for detergents and plasticizers. The $C_8$ and $C_9$ "Oxo" alcohol products are especially preferred for use in forming esters to be used as plasticizers in light colored or colorless plastics and resins.

The most readily available olefinic feed stocks for the "Oxo" reaction as outlined above are selected hydrocarbon streams derived from petroleum refinery sources and these frequently have sulfur contents as high as 0.1% or even higher. Furthermore, there are a variety of other ways in which sulfur may be introduced into the alcohol product during both the oxonation and hydrogenation stages. For instance, the acids used to form the metal oxonation catalyst for the purpose of introducing the metal into the reactor as the metallic naphthenate, stearate, or oleate, will usually be found to contain small amounts of sulfur containing compounds as contaminants, particularly when the acids themselves are of petroleum origin as they so frequently are. The synthesis gas used in the oxygenation zone which is primarily a mixture of carbon monoxide and hydrogen also may contain sulfur impurities and in fact the gaseous reactants employed in both stages of the "Oxo" reaction usually contain at least traces of sulfur impurities.

Any sulfur which is present in the crude reaction mixture containing the carbonyl compounds, is carried through the oxonation stage into the hydrogenation stage where it combines with the hydrogenation catalyst to reduce and ultimately completely destroy its activity unless sulfur insensitive catalysts are used. The sulfur sensitive catalysts are generally of the metallic type and the deactivating effect of the sulfur on their activity requires frequent reactivation, catalyst replacement, and increased amounts of a catalyst whose cost is definitely a commercial factor and may be prohibitively high. Thus, it is considered necessary for optimum operation in the hydrogenation step to employ a sulfur-insensitive catalyst. These sulfur insensitive catalysts, include particularly certain metallic sulfide hydrogenating catalysts, examples of such catalysts being molybdenum sulfide and tungsten sulfide. While these catalysts have the decided advantage of avoiding the inactivation due to sulfur content of the feed stock, they also possess the disadvantage that they permit the sulfur to pass unchanged through the hydrogenation zone and, indeed, in many cases, tend to introduce additional sulfur contamination into the alcohol. Thus, the final crude alcohol may have a total sulfur content from 30 to 100 p. p. m., or, in some cases, an even higher value if no cleanup operations are done previously. Very specially prepared "Oxo" alcohols may have sulfur contents in the range of 5–20 p. p. m.

One of the largest and most important uses developed for the synthetic alcohol products is that of producing esters suitable for plasticizers, by reaction with both aliphatic and aromatic acids or anhydrides including such examples as phthalic acid, maleic acid, adipic acid, and also phthalic and maleic acid anhydrides. Certain of the synthetic alcohols prepared by the oxonation and hydrogenation reaction are known to be especially suitable for the manufacture of ester plasticizers and particularly for use in clear plastics. These include alcohols of from $C_4$ to $C_{12}$ range such as the butyl alcohols, the octanols, and the nonanols. It has recently been discovered that synthetic alcohols of the $C_8$ series and chosen from the isooctyl type are among the best type of esterification alcohols to prepare plasticizers.

These esters are prepared in standard type esterification equipment employing reactors made of stainless steel or some other structural metal or, in some special cases, in glass-lined reaction vessels.

In a number of instances, particularly when the esters were produced in reactors having metallic surfaces exposed to the reacting mixtures, the products were found to be deficient as to the standards required for plasticizers, especially in such characteristics affected by color and plasticizing qualities such as the poor weathering tendency of the resins and plastics in which such plasticizers are used. These undesirable characteristics including the color are believed to be caused by impurities present in the synthetic alcohol product and particularly by the sulfur products present in the alcohol, although other impurity materials can also affect the color including polymerized and condensed higher molecular weight impurities as well as unreduced carbonyl compounds, unsaturated carbonylic compounds, and other non-alcoholic compounds. In fact, it has been found that, in order to obtain a high grade alcohol for esters which adequately meet all color specifications, the sulfur content must be reduced to a value somewhere from 1 to 5 parts per million, although somewhat higher concentrations can be tolerated, depending partly upon the form in which the sulfur occurs. Certain of the sulfur-containing impurities seem to be among the most active color formers during esterification reactions.

In general, the sulfur in the synthetic "Oxo" alcohols is in the form of organically combined sulfur. Although the type of organic impurities in which the sulfur occurs has not been fully determined, it is believed that the sulfur is present in a variety of forms. A generally deleterious color-forming action takes place during esterification when sulfur occurs in the final alcohol. Up to the present invention, it was considered necessary to remove the major portion of sulfur containing compounds from the finished alcohol by distillation or some other suitable purifying procedure. These purifications were especially necessary if the ester were manufactured in stainless steel equipment, or if excess unreacted alcohol were recycled to the esterification zone in order to obtain a crude ester of reasonably good color which would not need extensive purification prior to inclusion in plastics.

In typical alcohol recycle esterification operations, a 20% molal excess of alcohol is used based on the phthalic anhydride used, that is about 2.4 moles of alcohol per mole of phthalic anhydride. The esterification reaction is carried to substantial completion by esterification for a sufficient time. The unreacted alcohol is then stripped off from the ester product preferably under reduced pressure and blended with fresh alcohol for returning to the esterification zone. Thus, undesirable color forming materials have the opportunity to build up during the recycle stages to a point at which they must be purged from the system before continuing the recycling operation. This presents impurity problems which occur even though the actual reaction is carried out in corrosion resistant or glass-lined equipment. The problem is even more acute when the reaction is carried out in steel or other metal reactors. Low temperature catalytic esterification can also be carried out using an acidic catalyst such as a benzene sulfonic acid catalyst. The high temperature esterification is, however, a much more severe test as to the purity and stability of the reactants and is more truly representative of certain plant scale esterification conditions.

A study of the color formation phenomenon has indicated that the color formation is associated with the sulfur content of the isooctyl alcohol. Although the sulfur content of the alcohol is not deleterious per se, the sulfur compounds apparently react in some manner to produce color bodies which impart a light yellow to a deep red color to the crude ester that is not even partially removed from the ester by topping off the excess alcohol and phthalic anhydride. The color can be somewhat removed by vacuum distillation of the ester. However, the distillation of the isooctyl phthalates could be completely eliminated if a satisfactory color were obtained in the crude ester.

The highly purified isooctyl alcohol products, such as those made from alcohol purified through the borate ester or prepared over a sulfur sensitive metallic hydrogenation catalyst, show practically no color degradation in any method of esterification. The ester color can be expressed in terms of a Hazen ester color number, a high number indicating a darkened, low quality ester product. An ester product having a Hazen ester color of 75 to 200 is considered acceptable for commercial use.

This invention is based on the discovery that small amounts of certain phosphorus esters can be very effectively utilized for obtaining very light colored to colorless ester products from "Oxo" alcohols prepared in metallic reactors. The esters are added in small amounts relative to the amount of alcohol being used in the esterification reaction.

These esters which have been found effective may be employed to give good results in metallic reactors of iron generally, including mild steel and stainless steel.

The phosphorus esters particularly preferred are those in which the phosphorus has a valence of three, that is, the phosphite esters. The simple phosphite esters, $R_3PO_3$, in which the R group may be alkyl, aryl, alkaryl, aralkyl, or cycloalkyl are useful, and many of these compounds are well known. In general, they may be prepared by reaction of suitable phosphorus halide with an alcohol or phenol; for instance phosphorus trichloride or phosphorus tribromide. Appropriate care should be taken to have the esters free of halogen and halogen acids to avoid their corrosive effect. The aromatic type phosphite esters have been found especially useful. These include the triphenyl and tricresyl phosphites. The R groups of the esters may be substituted provided the groups do not cause an interference as to the color inhibiting effect or cause other undesirable side reactions.

Another class of phosphite esters which can be employed are the polyphosphites, which are prepared by reacting the phosphorus halide with polyhydroxy compounds, thus producing chain type molecules. In order to avoid a cross-linked insoluble product, it is desirable to employ an agent in the form of a monohydroxy compound. Thus, mixtures of mono and polyhydroxy compounds are employed to prepare these polyphosphite esters.

It is not necessary to use the tri-ester as the half-esters, that is, the mono and di-esters are also effective as color inhibiting materials. Thus, in the preparation of the esters, a less than stoichiometric amount of hydroxy compound may be employed; however, care should be taken to hydrolyze the unesterified halogen atoms of the phosphorus halide to hydroxy in order to avoid corrosion during preparation of the ester plasticizers in the metallic reactors.

In general, these esters are best employed in concentrations of from 0.10 to 5%, based on the weight of alcohol used in the preparation of the plasticizers. The use of larger amounts than necessary is uneconomical and may give side reactions and contamination, while smaller amounts than 0.10% do not satisfactorily prevent color formation during the esterification.

Some phosphorus esters are definitely not effective. For instance, tricresylphosphate was found not to be effective in reduction of crude ester color in 5 weight percent concentrations.

While it is not understood completely just how the preferred phosphites exercise the beneficial effect which they show with regard to suppressing color formation in the ester, it is believed that the organic phosphites are effective as color inhibitors because they exercise an actual color inhibiting effect within the esterification reaction itself in the presence of the sulfur-containing impurities. It is possible that color forming activity of the impurities may be inhibited by the reaction of the phosphites in some unknown manner with the troublesome impurity compounds particularly those containing sulfur such as the mercaptan type. The color improvement effects of the organic phosphites occur whether the impurities are in the alcohol or acid intermediates used in the esterification.

It is particularly intended as a preferred embodiment of this invention that a small amount of the phosphite compounds be included in the "Oxo" alcohol products such as those of the $C_7$ to $C_9$ range which are to be used to esterify phthalic and similar acids to prepare esters for plasticizers. This incorporation of the phosphites in the alcohol is an especially convenient method for insuring the presence of the color inhibitor and at the same time for introducing it into the metal reactor in which the ester is to be prepared.

Another particular feature of this invention is that the phosphite ester of the alcohol being employed in the esterification can be employed as the color inhibiting material. Thus, no foreign alcoholic or phenolic material is introduced into the reaction zone.

It does not greatly matter whether the very small amount of organic phosphite color inhibitor which is added to the esterification is removed from the final product or not, since the very small proportion of it necessary for effective color suppression will do no harm when allowed to remain in the final ester product. This is particularly true in view of the fact that many organic phosphorus esters are well known themselves as plasticizers for resins and hence would so act when present in the ester to be used as a plasticizer. Thus, these new inhibitors have the added advantage that they do not even require removal from the final ester product as they are in no way detrimental to its action. Even though no metal surface is in actual contact with the ester, it is considered desirable to use a color inhibitor in esterifications of sulfur-containing isooctyl alcohols especially where recycle alcohols are employed to any extent.

The invention will be described in more detail by the examples given below in which the good results obtained by the use of various phosphite compounds are shown by the data obtained in actual experimental testing.

EXAMPLE I

The polyphosphites were generally prepared by reacting one mole of a phenolic material with one mole of $PCl_3$. The resulting reaction product was further reacted with one mole of a dihydroxy compound to produce a more or less linear type polyphosphite. The preparation and details of these compounds are more fully described in copending application Serial No. 193,751, filed November 2, 1950. For instance, one phosphite type material was prepared from parahydroxy diphenyl, 2,5 di-t-butyl hydroquinone and $PCl_3$ to give this general type structure:

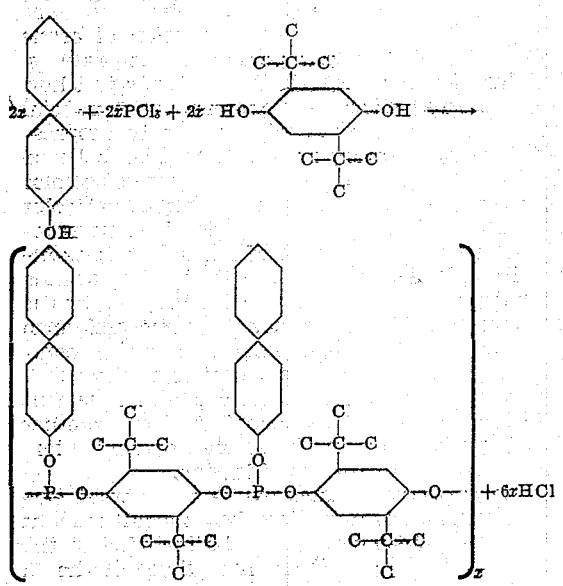

This material will be designated hereinafter as polyphosphite No. A.

EXAMPLE II

Similarly, as described in Example I, polyphosphite type compounds may be prepared from a wide variety of aryl and hydroquinone type materials. A second compound prepared from alpha-ethyl-phenyl phenol, 2,5-di-t-butyl hydroquinone and $PCl_3$ would have a type structure as follows:

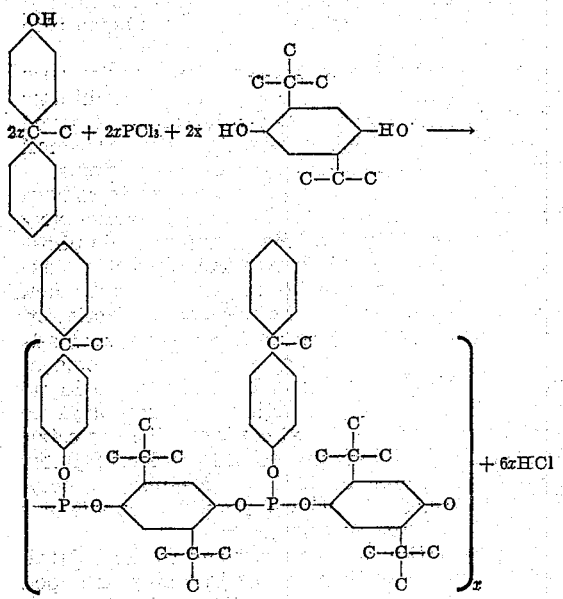

This latter material will be designated hereinafter as polyphosphite No. B.

EXAMPLE III

For experimental purposes in testing the efficiency of phosphites in preventing color formation, the esterification reactions, for example, a phthalylation of isooctyl alcohol, were carried out by refluxing together 60 parts by weight of a $C_8$ isooctyl alcohol prepared by the "Oxo" process with 25 parts by weight of phthalic anhydride together with 1 part of Bureau of Standards stainless steel in a conventional glass esterification reaction system. This type of experiment was most convenient and quite satisfactory in lieu of the use of small scale stainless steel or metal reactors which offer certain mechanical and technical difficulties. The reactions were carried out during a period of 2 hours at the boiling point of the mixture. The crude esterification mixture was then cooled and compared with Hazen color standards. A complete description of the standard Hazen ester color test is found in A. S. T. M. D268-46.

Experiments as described were carried out in which there were prepared esters of phthalic acid by reaction with an octyl alcohol derived by oxonation of a heptylene feed obtained by the U. O. P. polymerization of a $C_3$–$C_4$ olefin cut from petroleum sources. In Table I below, there is reported the data obtained when esterification reactions were done using the above-described compounds A and B in amounts of 0.5 weight percent of the polyphosphite based on the alcohol used in the esterification.

Table I

USE OF POLYPHOSPHITES AS COLOR INHIBITORS

| Polyphosphite | Description | Hazen Color No. |
|---|---|---|
| None | Deep Red | 2,500 |
| No. A | Almost water white | 85 |
| No. B | Light Straw | 160 |

It is evident from Table I that .5 weight percent of the polyphosphite compounds prepared as described in Examples A and B when used in an "Oxo" alcohol giving very bad ester color (2500 Hazen color value) when the esterification reaction is carried out in the presence of stainless steel, gives reduction in Hazen ester color to values of 85 to 160, which is at least equivalent to the ester colors obtained from alcohol from nonpetroleum sources, containing relatively no sulfur.

EXAMPLE IV

Other types of organic phosphites may also be used as color inhibitors in esterifications involving sulfur-containing alcohols particularly $C_8$ isooctyl alcohols of "Oxo" origin. Organic phosphites of the general formula $R_3PO_3$ when added in small amounts to esterifications in which "Oxo" alcohols such as isooctyl alcohol are being employed. Crude ester products having a color ranging from light yellow to water-white are obtained; concentrations of the phosphite compounds as low as 1% are effective.

In Table II below data are reported on esterifications which were conducted as in Example III, using 20% excess $C_8$ isooctyl "Oxo" alcohol and a reflux time of 4½ hours. Concentration of 1% of tricresyl phosphite was used as a color formation inhibitor in run 2.

Table II
USE OF TRICRESYLPHOSPHITE AS COLOR INHIBITOR

| Run No. | Tricresyl-phosphite, wt. percent | Crude ester color | |
|---|---|---|---|
| | | Description | Hazen ester color |
| 1 | None | dark brown | 4,000 |
| 2 | 1 | light yellow | 450 |

Other triaryl phosphites are considered to be effective as color inhibitors for esterifications using sulfur containing "Oxo" alcohols. Other compounds which are members of this class include alkyl phosphites, mixed alkyl-aryl phosphites, and the isooctyl phosphites themselves.

EXAMPLE V

Triphenyl phosphite has also been found to be effective as a color inhibitor in esterifications in the presence of stainless steel. The experiments from which data are reported in Table III, were carried out in substantially the same manner as those of Example III.

Table III
USE OF TRIPHENYLPHOSPHITE AS COLOR INHIBITOR

| Run No. | Alcohol | Triphenyl-phosphite, wt. percent | Ester Hazen colors |
|---|---|---|---|
| 1 | C₈ Oxo alcohol | None | 2,500 |
| 2 | do | 0.25 | 700 |
| 3 | do | 0.50 | 275 |
| 4 | do | 1.00 | 75 |
| 5 | Vacuum distilled Isooctyl alcohol Heart cut. | None | 420 |
| 6 | do | 0.4 | 150 |

It can be seen from Table III above that the purer vacuum distilled heart cut isooctyl alcohol required substantially less of the triphenylphosphite as a color inhibitor than does plant quality isooctyl alcohol. Thus, a part but not all of the color-forming impurities were removed or rendered incapable of degradative color formation by the additional distillation of the alcohol.

EXAMPLE VI

Another phosphite color inhibitor was prepared from isooctyl alcohol and PCl₃ to give tri-isooctyl phosphite. Three moles of isooctyl alcohol was allowed to react with one mole of sodium metal when reaction had substantially gone to completion, slightly less than one-third mole of PCl₃ was added and reacted with the sodium alcoholate. The resulting product was water-washed to remove HCl, PCl₃ and other soluble impurities. The excess isooctyl alcohol is unimportant. This phosphite product was added to an esterification carried out as described in Example III. The tri-isooctyl phosphite in concentration of .5 weight percent, based on the alcohol used, was found to decrease the Hazen ester color of the ester product in comparison to the value of the ester color prepared in a reaction to which no phosphite was added.

Table IV
USE OF TRI-ISOOCTYLPHOSPHITE AS COLOR INHIBITOR

| Run No. | Alcohol | Tri-isooctyl-phosphite, wt. percent | Ester Hazen Colors |
|---|---|---|---|
| 1 | C₈ Oxo alcohol | None | 1,475 |
| 2 | do | .5 | 450 |

What is claimed is:

1. A process for the preparation of organic esters in the presence of stainless steel surfaces from a dibasic organic acid of the group consisting of maleic, adipic, and phthalic acids and a monohydric alkanol having 4 to 12 carbon atoms per molecule having sulfur-containing impurities which cause color formation unless inhibited during the esterification, said alkanol being produced in a two-stage operation consisting of a first stage in which hydrogen, carbon-monoxide, and an olefin are contacted in the presence of an oxonation catalyst, forming a product predominantly aldehyde and of a second stage in which the said aldehyde product is catalytically reduced with hydrogen to form the corresponding alkanol which comprises carrying out the esterification of the alcohol having the sulfur-containing impurities in the presence of from 0.10 to 5 weight percent based on the alcohol of an organic phosphite ester from the group consisting of trialkyl phosphite, triphenyl phosphite, tricresyl phosphite, and organic homocyclic polyphosphite ester to inhibit color formation during the esterification, and obtaining a relatively colorless organic ester product from the esterification.

2. A process for the preparation of phthalic esters in the presence of stainless steel surfaces from phthalic acid and an iso-octyl alcohol having sulfur-containing impurities which cause color formation during the esterification unless inhibited, said alcohol being produced in a two-stage operation consisting of a first stage in which hydrogen, carbon monoxide, and an olefin are contacted in the presence of an oxonation catalyst, forming a product predominantly aldehyde and of a second stage in which the said aldehyde product is catalytically reduced with hydrogen to form the corresponding alcohol which comprises incorporating in the alcohol from 0.10 to 5 weight percent based on the alcohol of an organic phosphite ester from the class consisting of trialkyl phosphite, triphenyl phosphite, tricresyl phosphite, and organic homocyclic polyphosphite esters, and heating a mixture of the alcohol containing said impurities and the organic phosphite ester with the phthalic acid to a boiling temperature for a period of about two hours in the presence of stainless steel surfaces to obtain a relatively colorless phthalate ester.

3. A process as described in claim 1 in which the phosphite ester is triphenyl phosphite.

4. A process as described in claim 1 in which the phosphite ester is tricresyl phosphite.

5. A process as described in claim 1 in which the phosphite ester is an organic homocyclic polyphosphite ester.

BOYD E. HUDSON, JR.
HOWARD L. WILSON.
JOSEPH F. NELSON.

REFERENCES CITED

The following references are of record in the file of this patent:

UNITED STATES PATENTS

| Number | Name | Date |
|---|---|---|
| 1,948,281 | Smith | Feb. 20, 1934 |
| 1,993,737 | Graves | Mar. 12, 1935 |
| 2,164,188 | Groll | June 27, 1939 |
| 2,197,546 | Baxter | Apr. 16, 1940 |

FOREIGN PATENTS

| Number | Country | Date |
|---|---|---|
| 588,833 | Great Britain | June 4, 1947 |